(12) United States Patent
Glueck et al.

(10) Patent No.: US 11,204,049 B2
(45) Date of Patent: Dec. 21, 2021

(54) COMPONENT HAVING A JOINING ELEMENT, COMPONENT COMBINATION OF AT LEAST TWO COMPONENTS, AND METHOD FOR PRODUCTION THEREOF

(71) Applicant: Bayerische Motoren Werke Aktiengesellschaft, Munich (DE)

(72) Inventors: Bernhard Glueck, Fuerstenfeldbruck (DE); Robert Kirschner, Olching (DE); Josef Meinhardt, Munich (DE); Franz-Xaver Schweighart, Aholming (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 282 days.

(21) Appl. No.: 16/451,753

(22) Filed: Jun. 25, 2019

(65) Prior Publication Data
US 2019/0316617 A1  Oct. 17, 2019

Related U.S. Application Data

(63) Continuation of application No. PCT/EP2017/079874, filed on Nov. 21, 2017.

(30) Foreign Application Priority Data

Jan. 16, 2017  (DE) ..................... 10 2017 200 564.5

(51) Int. Cl.
*B32B 41/00*  (2006.01)
*F16B 5/08*  (2006.01)
(Continued)

(52) U.S. Cl.
CPC ............... *F16B 5/08* (2013.01); *B23K 11/11* (2013.01); *B23K 11/20* (2013.01); *B29C 65/48* (2013.01);
(Continued)

(58) Field of Classification Search
CPC ........ F16B 5/08; F16B 11/006; F16B 17/008; B23K 11/11; B23K 11/20; B23K 2103/18;
(Continued)

(56) References Cited

U.S. PATENT DOCUMENTS

| 5,455,986 A | 10/1995 | Gentile |
| 2010/0247869 A1* | 9/2010 | Meyer ................... B29C 64/153 |
| | | 428/172 |
| 2013/0309520 A1 | 11/2013 | Lang et al. |

FOREIGN PATENT DOCUMENTS

| CN | 2161771 Y | 4/1994 |
| CN | 103423257 A | 12/2013 |

(Continued)

OTHER PUBLICATIONS

Chinese-language Office Action issued in Chinese Application No. 201780071122.1 dated Oct. 19, 2020 with English translation (18 pages).

(Continued)

*Primary Examiner* — Michael N Orlando
*Assistant Examiner* — Joshel Rivera
(74) *Attorney, Agent, or Firm* — Crowell & Moring LLP

(57) ABSTRACT

A component including at least one joint, at which a joining connection to a further component is to be formed later, is provided. A joining element having a holding section is pressed into the component, and the joining element also has a functional section, by way of which at least one further function can be implemented. The holding section of the joining element is arranged in a passage hole, and the passage hole is widened in at least one edge region by an embossing. The holding section of the joining element is pressed into the passage hole and is connected to the hole wall in a force-fitting and/or form-fitting manner and engages in the embossing. A component combination of at (Continued)

least two components which includes such a component and a method for producing the component and the component combination are also provided.

19 Claims, 2 Drawing Sheets

(51) Int. Cl.
*B23K 11/11* (2006.01)
*B23K 11/20* (2006.01)
*B29C 65/48* (2006.01)
*B29C 65/56* (2006.01)
*B29C 65/00* (2006.01)
*F16B 11/00* (2006.01)
*B23K 103/18* (2006.01)
*B29L 31/30* (2006.01)

(52) U.S. Cl.
CPC ...... *B29C 65/562* (2013.01); *B29C 66/02242* (2013.01); *B29C 66/41* (2013.01); *B29C 66/721* (2013.01); *B29C 66/742* (2013.01); *F16B 11/006* (2013.01); *B23K 2103/18* (2018.08); *B29L 2031/30* (2013.01)

(58) Field of Classification Search
CPC ........... B23K 1/19; B23K 11/34; B29C 65/48; B29C 65/562; B29C 66/02242; B29C 66/41; B29C 66/721; B29C 66/742; B29C 66/1122; B29C 66/21; B29C 66/7212; B29C 66/74283; B29L 2031/30
USPC ..... 403/272; 156/60, 64, 350, 351, 378, 379
See application file for complete search history.

(56) References Cited

FOREIGN PATENT DOCUMENTS

| DE | 93 01 373 U1 | 4/1993 |
|---|---|---|
| DE | 100 15 713 A1 | 10/2001 |
| DE | 10 2004 025 492 A1 | 8/2009 |
| DE | 10 2010 020 569 A1 | 11/2011 |
| DE | 10 2010 031 709 A1 | 1/2012 |
| DE | 100 60 390 B4 | 4/2012 |
| DE | 10 2010 053 608 A1 | 6/2012 |
| EP | 0 478 166 A2 | 4/1992 |
| EP | 3 034 280 A1 | 6/2016 |

OTHER PUBLICATIONS

Chinese-language Office Action issued in Chinese Application No. 201780071122.1 dated May 21, 2021 with English translation (18 pages).

International Search Report (PCT/ISA/210) issued in PCT Application No. PCT/EP2017/079874 dated Jan. 24, 2018 with English translation (four (4) pages).

German-language Written Opinion (PCT/ISA/237) issued in PCT Application No. PCT/EP2017/079874 dated Jan. 24, 2018 (six (6) pages).

German-language Search Report issued in counterpart German Application No. 10 2017 200 564.5 dated Nov. 24, 2017 with partial English translation (14 pages).

Chinese-language Office Action issued in Chinese Application No. 201780071122.1 dated Aug. 12, 2021 with English translation (13 pages).

* cited by examiner

COMPONENT HAVING A JOINING ELEMENT, COMPONENT COMBINATION OF AT LEAST TWO COMPONENTS, AND METHOD FOR PRODUCTION THEREOF

CROSS REFERENCE TO RELATED APPLICATIONS

This application is a continuation of PCT International Application No. PCT/EP2017/079874, filed Nov. 21, 2017, which claims priority under 35 U.S.C. § 119 from German Patent Application No. 10 2017 200 564.5, filed Jan. 16, 2017, the entire disclosures of which are herein expressly incorporated by reference.

BACKGROUND AND SUMMARY OF THE INVENTION

The invention relates to a component having an auxiliary joining element, to a component assembly of at least two components, and to a method for producing the component and the component assembly.

The increased use of lightweight materials in the automotive industry means that there are always new production-related challenges. Joining methods that have been used for decades and are tailored for the use of steel materials can be transferred to modern lightweight materials only to a limited extent.

For example, nowadays, direct welding or soldering of components is not always possible, for example when material pairs made of different metal materials, for example aluminum and steel, or materials of different types, for example metals and fiber composite materials, are intended to be joined.

To this end, it is known from the prior art to introduce into one of the two joining partners an auxiliary joining part that allows it to be welded to the other joining partner. The auxiliary joining parts that are used have a rivet- or nail-like form. They are introduced in a first component by way of their shank, wherein they are supported on the first component with their head and are welded to the other component with their foot or shank. In this regard, reference is made for example to the patents DE 100 15 713 A1, DE 100 60 390 B4, DE 10 2004 025 492 A1, and DE 10 2010 053 608 A1.

Furthermore, the document DE 10 2010 031 709 A1 discloses a component assembly having such an auxiliary joining part, which is used to connect the components by way of resistance welding and which also has, at its head, a functional portion that allows for example further components to be fastened.

Against this background, it is an object of the invention to specify a flexible possible way with which components made of very different materials can be joined and which is improved with respect to the prior art or has at least one advantage.

This and other objects are achieved by a component, a component assembly, and a method for producing such a component and a method for producing such a component assembly in accordance with the embodiments of the invention.

A component is specified, in which, at at least one joint, at which a joined connection is subsequently intended to be formed with a further component, an auxiliary joining element has been pressed with a retaining portion into the component. The auxiliary joining element furthermore has a functional portion with which at least one further function is realizable. Preferably, the functional portion adjoins the retaining portion. According to the invention, the retaining portion of the auxiliary joining element is arranged in a through-hole, and the through-hole is expanded at at least one peripheral region by an indentation. The retaining portion of the auxiliary joining element has been pressed into the through-hole and is connected to the hole wall in a force- and/or form-fitting manner, and the retaining portion engages in the indentation.

Furthermore, a component assembly of at least two components is specified, which are joined at at least one joint. The component assembly includes a first component and a second component, wherein, in the first component, an auxiliary joining element has been pressed with a retaining portion into the component at the joint, and the auxiliary joining element furthermore has a functional portion, preferably adjoining the retaining portion, with which at least one further function is realizable. According to the invention, the retaining portion of the auxiliary joining element is arranged in a through-hole, and the through-hole is expanded at at least one peripheral region by an indentation, wherein the retaining portion of the auxiliary joining element has been pressed into the through-hole and is connected to the hole wall in a force- and/or form-fitting manner, and the retaining portion engages in the indentation. The auxiliary joining element is connected in a materially bonded manner to the second component or to a second auxiliary joining element provided in the second component.

The through-hole may be formed for example by cutting or punching and has preferably a closed hole contour or cut contour. With regard to the component surfaces, the through-hole is delimited in each case by a peripheral region. The auxiliary joining element is connected to the first component in a form-fitting manner transversely to the joining axis. The hole geometry of the through-hole and the external geometry of the auxiliary joining element are coordinated with one another at least partially in a corresponding manner.

The through-hole and/or the indentation can have for example a circular cross-section or alternative cross-sections. Thus, it may be easier to introduce an adhesive when the cross-section of the hole and/or indentation has for example a jagged or polygonal shape, or the through-hole with the indentation is formed in a crown-shaped manner.

In the region of the indentation, the hole cross-section is enlarged, for example the diameter of the through-hole is enlarged in the region of the indentation. The retaining portion of the auxiliary joining element forms, in the region of the indentation, an undercut, which secures the auxiliary joining element in one direction in a form-fitting manner with regard to pushing through the through-hole. Contrary to the supposition that the reduced component thickness in the region of the indentation has a negative effect on the strength of the connection, it has been shown that surprisingly high strengths are achievable. This is presumed to be attributable to the process of indentation, whereby material consolidation in the peripheral region of the indentation is achieved, which, in combination with the subsequent pressing in of the retaining element, is increased even further. Furthermore, it has been found that, as a result of the introduction of the indentation, a reduction in hydrogen embrittlement occurs and a sensitivity to edge cracking in this region can be counteracted.

The indentation can be formed on one side. Preferably, the indentation is formed in a manner encircling the through-hole in the entire peripheral region. The indentation can extend for example by up to 20% into the depth of the through-hole, by up to 40% or up to half the depth of the through-hole. It may also be advantageous for the indentation to extend by more than 50% and in particular by more than 60% into the depth of the through-hole.

It has been found to be particularly advantageous when, in one configuration, the indentation is configured as an encircling chamfer. In the region of the chamfer, the hole wall is inclined with respect to the longitudinal axis of the through-hole and the diameter of the through-hole increases continuously in the region of the chamfer to the periphery of the through-hole. In the region of the chamfer, the hole wall can be inclined for example at an angle to the longitudinal axis of the through-hole, which is in a range from 30 to 60 degrees or in a range from 40 to 50 degrees and may in particular be 45 degrees.

In one configuration, this effect can be exploited on both sides of the component, to which end an encircling indentation or chamfer is impressed in both peripheral regions of the hole wall, the retaining portion of the auxiliary joining element engaging therein. The indentations or chamfers can be formed symmetrically such that identical indentations or chamfers are impressed on both sides of the through-hole, or can be formed asymmetrically, i.e. with different forms or angles and/or a different depth.

That portion of the auxiliary joining element that can transmit a force to the component when loaded is referred to as the retaining portion of the auxiliary joining element. Advantageously, the thickness of the retaining portion can be reduced and, in the pressed-in state, can be less than or substantially the same as the thickness of the component. The expression "substantially the same" should be understood in this connection as meaning that the thickness of the retaining element after pressing in can be the same as the thickness of the component or, due to manufacturing tolerances, can be for example a few tenths of a millimeter thicker than the component thickness. The through-hole with the indentation or chamfer affords the possibility of fixing the retaining element in the component in a form-fitting manner in the direction of the joining axis, such that the retaining portion can be configured for example without a head, i.e. without a portion projecting laterally beyond the diameter of the through-hole. Advantageously, the retaining portion can have a geometry that is easy to produce and be formed for example in a cylindrical manner.

In one configuration, the retaining portion of the auxiliary joining element is accommodated entirely in the through-hole, i.e. force transmission between the component and the retaining portion takes place exclusively at the hole wall of the through-hole. To this end, the retaining portion can end for example flush with the component surfaces or be set back into the through-hole with respect to said surfaces.

An end face of the retaining portion, preferably an end face, arranged on the side facing away from the functional portion, of the retaining portion can be used to establish a materially bonded connection to the second component. To this end, in one configuration, it may be advantageous for the retaining portion to extend through the first component and to be at least flush with a top side, facing away from the functional portion, of the first component, or to project there beyond. If consumer impressions are provided in the region of the auxiliary joining element, it is possible for the retaining portion to protrude with respect thereto, but to be set back with respect to the rest of the surface of the component or be formed flush with the rest of the surface. The end face of the retaining portion can be level or provided with a structure, for example a point-form protrusion for igniting an arc. Furthermore, the end face of the retaining portion can also be set back with respect to the top side of the first component.

Furthermore, when the auxiliary joining element is pressed into the component, an interlayer element, for example a film for preventing contact corrosion or an adhesive layer, can additionally be introduced between the retaining portion and the hole wall.

The auxiliary joining element may have been additionally connected in a materially bonded manner to the interlayer element and/or the component into which it has been pressed.

The functional portion of the auxiliary joining element is designed such that it provides an additional function, preferably a fastening function. To this end, the functional portion can be in the form for example of a bolt shank, threaded bolt, nut, compressed tube or part of a clip connection. The functional portion can protrude with respect to the component; alternatively, it is also contemplated for the functional portion to be integrated into the interior of the retaining portion. The functional portion may have already been formed before the pressing-in operation or be formed during pressing in by a correspondingly formed pressing tool, for example by shaping a part of the retaining portion. Likewise, the auxiliary joining element can be formed by a preformed element, for example in the manner of a threaded bush or helicoil.

The materially bonded joining can take place for example by welding, soldering or adhesive bonding, or by a combination thereof. Such a component assembly is appropriate for connecting different materials together, which would not otherwise be solderable, weldable or bondable, for example connections involving different metals (for example aluminum and steel) or materials of different types (for example fiber composite plastics with a metal). However, it is also possible to connect identical or equivalent materials using the method.

The material of the auxiliary joining element is preferably chosen such that it has the suitability intended for the particular connecting process, for example provides an appropriate suitability for soldering, welding or adhesive bonding to the material of the second component.

The auxiliary joining element can be joined in a materially bonded manner to the base material of the second component. To this end, it is particularly advantageous for the auxiliary joining element to be made of a material that is joinable in a sufficiently materially bonded manner to the base material of the second component, and is preferably sufficiently weldable or solderable.

In one configuration, provision is made for a further auxiliary joining element to be introduced at the joint in the second component and for the auxiliary joining element of the first component to be connected in a materially bonded manner to the auxiliary joining element of the second component. The further auxiliary joining element can be for example a metal slug, i.e. a small metal plate without a head and shank, which is pressed into the second component. The second auxiliary joining element can, as described for the retaining portion of the first auxiliary joining element, have been pressed into a through-hole provided on one or both sides with an indentation. The indentations can be configured preferably as chamfers. The materials of the auxiliary joining elements are preferably selected such that the auxiliary joining elements are able to be joined together sufficiently well in a materially bonded manner, and are preferably sufficiently weldable or solderable. As the second auxiliary joining element, it is moreover also possible to use an auxiliary joining element as is described for the first auxiliary joining element, i.e. having a corresponding retaining portion and an additional functional portion.

In one advantageous configuration, the first or the second component or both components is/are made of a lightweight material, for example a light metal (for example aluminum, magnesium or alloys thereof) or of a fiber composite plastic, and the auxiliary joining elements are made of steel. Thus, it is advantageously possible even to join modern lightweight materials with existing joining devices, for example conventional resistance spot welding systems. The first and second component can be made of the same or different materials.

The functional portion can for example be used to fasten a further component to the component assembly. The functional portion can be clipped or pressed for example into a corresponding receptacle in the further component, or the functional component can be part of a screw connection that fixes the further component. Alternative fastening possibilities are conceivable.

The components can be formed preferably from a sheet-metal material, for example a steel sheet, aluminum sheet or magnesium sheet, or a sheet-like material, for example fiber reinforced plastic (for example carbon-fiber, glass-fiber or aramid-fiber reinforced plastic), or it can be an organosheet. In principle, it can also be a cast part or profiled part, which is formed in a sheetlike manner at the joint. The above-described component connection is suitable for example particularly for material thicknesses in the range from 0.5 mm to 5 mm, and in particular also for thin sheets with a thickness of 2.99 mm or less.

The components can be preferably vehicle components. Preferably, the component assembly is an assembly component (sandwich component) and in particular a body component. However, it can also be for example a chassis component or an interior component.

The component assembly can have a single joint, but preferably the components are connected together at a plurality of joints. The plurality of joints can be formed in an identical or different manner.

The component assembly can furthermore have a third or further components, which are likewise connected with the aid of the described method or by way of other known joining methods.

Furthermore, a method for producing a component having an auxiliary joining element is specified, having the acts of:
creating a through-hole at at least one joint in a component;
introducing an indentation such that the through-hole is expanded in at least one peripheral region; and
pressing an auxiliary joining element into the through-hole such that a retaining portion of the auxiliary joining element is connected in a force- and/or form-fitting manner to the hole wall and engages in the indentation, wherein the auxiliary joining element furthermore has a functional portion.

Furthermore, a method for producing a component assembly of at least two components that are joined at at least one joint is specified. The method includes the acts of: creating a through-hole at at least one joint in a component;
introducing an indentation such that the through-hole is expanded in at least one peripheral region;
pressing an auxiliary joining element into the through-hole such that a retaining portion of the auxiliary joining element is connected in a force- and/or form-fitting manner to the hole wall and engages in the indentation, wherein the auxiliary joining element furthermore has a functional portion;
positioning and orienting a second component relative to the first component; and forming a materially bonded connection at the joint by welding, soldering or adhesive bonding, wherein the auxiliary joining element is connected in a materially bonded manner to the base material of the second component or to a second auxiliary joining element, which is provided at the joint in the second component.

As a result of the engagement of the retaining portion in the region of the indentation or chamfer, there is also a form fit in a direction along the joining axis.

Advantageously, the second component is positioned such that it is arranged on that side of the first component that faces away from the functional element.

The through-hole may be formed for example by cutting or punching and has preferably a closed hole contour or cut contour. The indentation is formed for example by impressing by way of a correspondingly formed impressing tool. This can take place at the same time as the creation of the through-hole or in a separate production step, for example before or after the creation of the through-hole. If the component with a through-hole is a component made of a fiber composite plastic (FRP), the through-hole with the indentation can for example already be formed during the production of the FRP component, for example during the pressing of the component semifinished product. Such an indentation, too, achieves the described consolidation on account of an increased fiber volume ratio in the peripheral region of the through-hole.

If the through-hole is formed in a metal component, it may be advantageous, in one configuration, for the impression of the indentation or chamfer to take place before the formation of the through-hole. The impression of the indentation or chamfer creates a notch in the metal component, wherein any component coating or oxide layer that is present is at least partially retained at the notch surfaces.

Furthermore, during the pressing of the auxiliary joining element into the component, a protective layer, for example a film for preventing contact corrosion, can additionally be introduced between the auxiliary joining element and the hole wall.

With the method, the components can be connected in a pre-fixed manner and subsequently be additionally connected together by further joining methods. It is likewise possible for the component assembly to be formed only by the above-described method, wherein the components are joined preferably at a plurality of joints.

If a further layer is additionally introduced between the auxiliary joining element and the component (for example for electrochemical separation or an adhesive layer), a material bond can additionally be achieved by the pressing and/or a heat treatment. The heat treatment can take place before, during or after the pressing-in operation. Likewise, as a result of the auxiliary joining element being welded to a further component, a materially bonded connection can additionally arise between the auxiliary joining element and that component into which the auxiliary joining element has been pressed.

The auxiliary joining element is pressed in for example with a suitable tool, for example a pressing tool or a C clamp. To this end, the retaining portion is introduced into the corresponding through-hole and pressed there, wherein the material of the retaining portion is permanently deformed and is pressed against the hole wall in a force-fitting manner. Furthermore, in some configurations, provision can be made for the material of the retaining portion to additionally flow into the indented or chamfered region and to form in each case an undercut there. The auxiliary joining element is thus also fixed in the component in a form-fitting manner in the direction of the joining axis F.

If, at the other peripheral region of the hole wall, an encircling indentation or chamfer is likewise impressed, the latter can be created as described for the first indentation or chamfer. After the retaining portion has been pressed into the through-hole, the retaining portion then has, at both indentations or chamfers, an undercut that fixes it in the through-hole.

Furthermore, it is possible for the through-hole and/or the indentation not to be created in a separate step but rather by the introduction of the auxiliary joining element itself. The through-hole can be created for example in that a self-tapping auxiliary joining element is driven, for example by means of rotary impact, into the component.

The method is used to produce the above-described component part having an auxiliary joining element or to produce the component assembly, and so the same technical effects and advantages are achieved as are described with respect thereto.

By way of the invention, the cost-effective and reproducible production of component assemblies and assembly components is possible, in particular in a mixed construction. It is rendered possible to join component assemblies having lightweight materials, for example aluminum, in existing welding systems and with existing welding processes, since, for example, as a result of the use of auxiliary joining elements made of steel, it is also possible to join aluminum components together or to join aluminum components to steel components. The component assembly according to the invention can be embodied in a particularly flat manner by the retaining portion countersunk in the component, said retaining portion fastening the auxiliary joining element to the component. The component assembly according to the invention is also characterized by high strength and high flexibility in the design of the joined connection. In addition, the component assembly according to the invention is also suitable for thin-sheet connections.

The above-described properties, features and advantages of this invention and the manner in which these are achieved will become more clearly understandable from the drawing and in conjunction with the following description of the exemplary embodiments. Where the term "can" or "may" is used in this application, this relates both to the technical possibility and to the actual technical implementation.

In the following text, exemplary embodiments are explained on the basis of the accompanying drawings, in which, in each case in a schematic illustration.

DETAILED DESCRIPTION OF THE DRAWINGS

Figure 1:
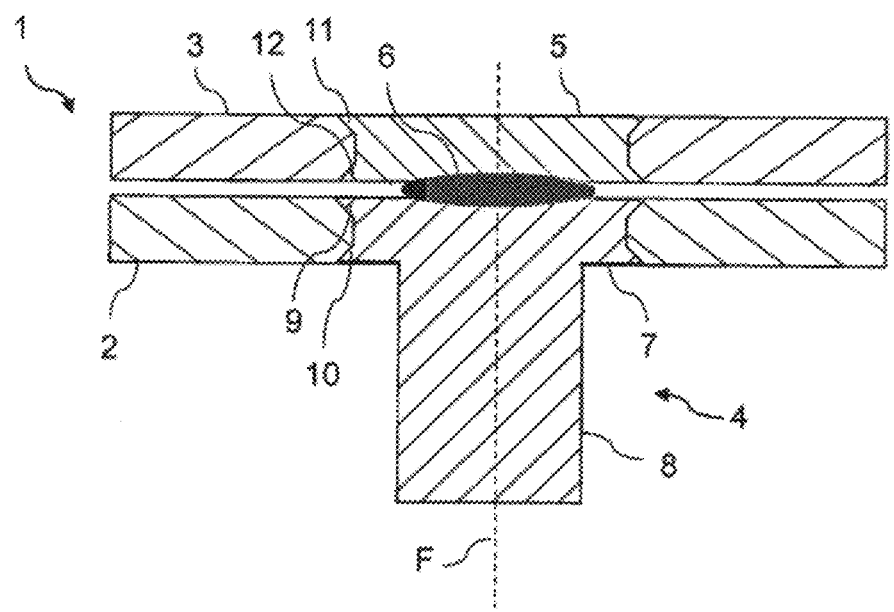
FIG. 1 is a sectional view of an example of a component assembly according to the invention.

FIG. 1 shows a sectional illustration of the joint of a component assembly 1, which includes two components 2, 3. The component assembly 1 has been produced by the method according to the invention. The component assembly 1 can have a plurality of such joints, which may be formed identically or differently.

The first component 2 is a sheet-form component made of a lightweight material, for example aluminum or a fiber composite plastic. The term aluminum also comprises the corresponding aluminum alloys. The second component 3 is a sheet-form component and is likewise made of a lightweight material. The two components 2, 3 have been fixedly joined indirectly at the joint by means of a first auxiliary joining element 4, which has been pressed into the first component 2, and a second auxiliary joining element 5, which has been pressed into the second component 3, by a weld spot 6 connecting the two auxiliary joining elements in a materially bonded manner. The auxiliary joining elements 4, 5 are each made of a steel material. The welding was carried out by way of a conventional resistance spot welding process. Likewise, other welding methods are possible, or elongate weld seams. As an alternative to welding, the auxiliary joining elements could also be joined together by a soldered connection or an adhesive bond. If appropriate, the components can have additionally been adhesively bonded at a different point than the joint.

The first auxiliary joining element 4 has a retaining portion 7, with which it has been pressed into the first component 2 in a force- and form-fitting manner, and a functional portion, 8, which is illustrated only schematically in the figures and which is configured to fulfill a further function, preferably to provide a further fastening possibility. To this end, the functional portion 8 can be configured for example as part of a clip connection, as a pin or with a thread.

The retaining portion 7 of the first auxiliary joining element 4 is received entirely in the first component 2. It is not supported on a surface of the first component 2, but rather is also fixed in the component 2 in a form-fitting manner in the direction of the joining axis F by two undercuts 9 and 10.

Figure 2:
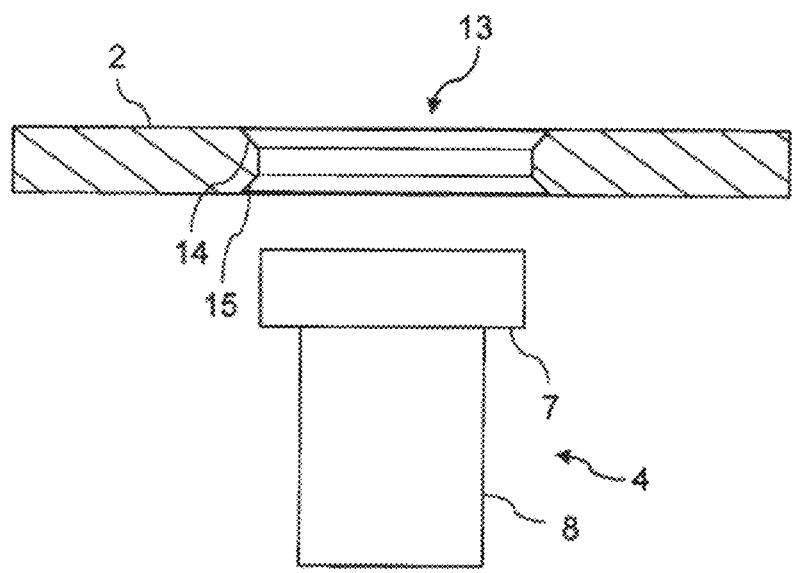
FIG. 2 is a sectional view of a further example of a component assembly.

FIG. 2 shows the first component 2 and the first auxiliary joining element 4 before the latter is pressed into the first component 2. The first auxiliary joining element 4 has a head-free retaining portion 7 with a substantially cylindrical shape. The retaining portion 7 is pressed into a through-hole 13 that has been produced beforehand in the first component 2, for example by cutting or punching. In the peripheral region of the hole 13, respective indentations 14 and 15 have been impressed in the form of a chamfer. The retaining portion 8 is now pressed into the through-hole 13, wherein the material of the retaining portion 8 is permanently deformed and enters into a force-fitting connection with the hole wall. Around the indentations 14, 15, the retaining portion 8 also forms in each case an undercut.

The second auxiliary joining element 5 is a metal slug which has been pressed into the second component 3 and has likewise been fixed in the second component in a form-fitting manner in the direction of the joining axis F via two undercuts 11 and 12. The second auxiliary joining element is pressed in as described above for the first auxiliary joining element 4.

In a following step, the second component is positioned with respect to the first component and the weld 6 is formed, to which end for example the auxiliary joining elements can be brought into contact with the electrodes of a resistance spot welding device.

Figure 3:
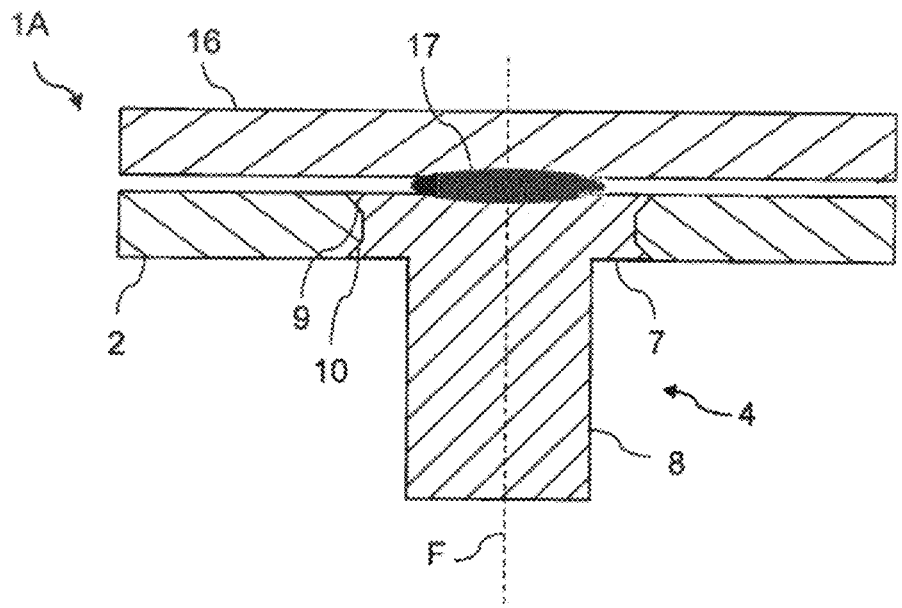
FIG. 3 is a procedure for pressing in the auxiliary joining element.

FIG. 3 shows an alternative component assembly 1A. Where identical reference signs are used, what has been said for FIG. 1 applies correspondingly. The component assembly 1A comprises the first component 2 with its auxiliary joining element 4, and a third component 16, which is made of a steel material. The weld 17 connects the auxiliary joining element 4 in a materially bonded manner to the base material of the third component 16.

In contrast to conventional component assemblies with auxiliary joining elements, a much smaller height of the component assembly can be achieved, since the auxiliary joining elements can, if required, terminate flush with the workpiece surfaces. Of course, it is possible to allow the auxiliary joining elements to protrude for example in the region of the joint beyond the workpiece surface, for example for the targeted formation of an ignition spark.

It is likewise possible, during the pressing of the auxiliary joining element into the component, for a protective layer (not illustrated), for example a film for preventing contact corrosion, to be additionally introduced between the auxiliary joining element and the hole wall.

The shown gap between the components is not necessary. In the component assembly, the components can also rest directly on one another.

Figure 4:
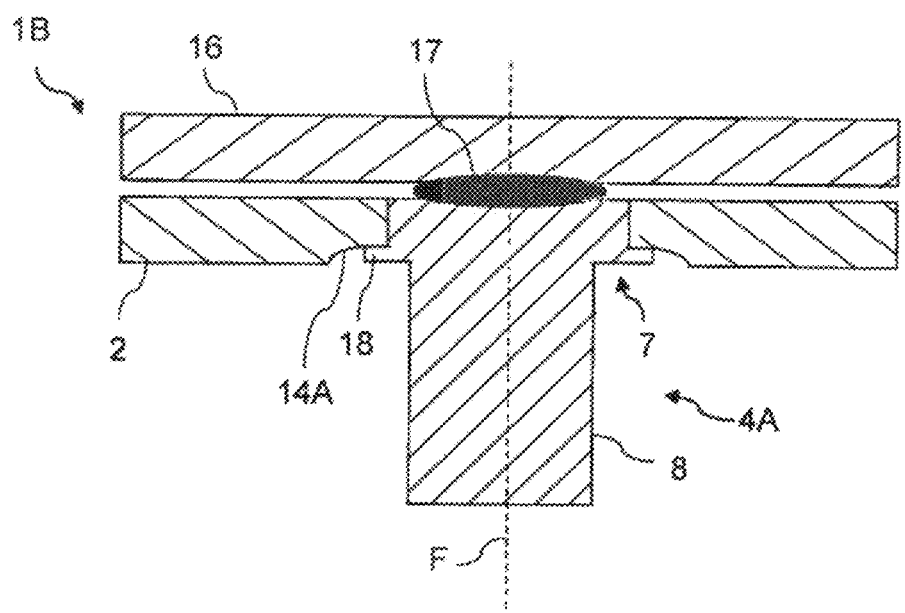
FIG. 4 is a sectional view of a further example of a component assembly.

Although two indentations in the form of chamfers are shown in each case in the figures, the through-holes in the components can also each be provided with an indentation or chamfer only on one side. Similarly, the form of the indentation is not limited to the chamfer geometry shown in FIGS. 1 to 3; rather, modifications are possible, for example the domed indentation 14A shown in FIG. 4. It is also possible for the retaining portion to already have, before the pressing-in, a shape which bears in the manner of an undercut against the indentation, for example the cylindrical auxiliary joining element 4A shown in FIG. 4 with an expanded head portion 18 in the region of the retaining portion 7.

In FIGS. 1-3, for reasons of clarity, the profile of the hole wall is illustrated as if the inclined hole wall transitions directly into a perpendicular hole-wall portion in the region of the chamfer. In reality, however, it is possible for a collar-like encircling plateau to be formed between the inclined wall portion and the perpendicular wall portion, said plateau being brought about by the geometry of the impressing stamp.

As a result of the impressed chamfer in the through-hole and the pressed-in auxiliary joining element, very high strengths are achieved. For example, in one test, a through-hole with a core diameter of 12 mm was formed in a sheet made of a 5000 series aluminum alloy (basic strength of 120 to 140 N/mm$^2$) with a thickness of 2.5 mm. At the peripheral regions, a chamfer was impressed at an angle of 45 degrees with an impression depth of 0.7 mm and a plateau width of 0.4 mm. A cylindrical sheet-metal slug made of S355 with a thickness of 4 mm and a diameter prior to pressing of 11.7 mm was pressed into the through-hole. After pressing, pull-out forces for the slug of 8.5 to 12.6 kN resulted for each side.

The exemplary embodiments are not true to scale and not limiting. Modifications that fall within the routine activities of a person skilled in the art are possible.

LIST OF REFERENCE SIGNS

1, 1A Component assembly
2 First component
3 Second component
4, 4A, 5 Auxiliary joining element
6 Weld spot
7 Retaining portion
8 Functional portion
9-12 Undercuts
13 Through-hole
14, 15 Chamfers
16 Component
17 Weld
18 Head portion
F Joining axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component, comprising:
   at least one joint, at which a joined connection is subsequently to be formed with another component; and
   an auxiliary joining element that has been pressed with a retaining portion into the component where the auxiliary joining element has a functional portion with which at least one further function is realizable, wherein
   the retaining portion of the auxiliary joining element is arranged in a through-hole,
   the through-hole is expanded at at least one peripheral region by an indentation,
   the retaining portion of the auxiliary joining element has been pressed into the through-hole and is connected to a hole wall in a force- and/or form-fitting manner and engages in the indentation, and
   the through-hole is expanded at both peripheral regions by an indentation into which the retaining portion of the auxiliary joining element engages.

2. A component, comprising:
   at least one joint, at which a joined connection is subsequently to be formed with another component; and
   an auxiliary joining element that has been pressed with a retaining portion into the component where the auxiliary joining element has a functional portion with which at least one further function is realizable, wherein
   the retaining portion of the auxiliary joining element is arranged in a through-hole,
   the through-hole is expanded at at least one peripheral region by an indentation,
   the retaining portion of the auxiliary joining element is fixed to a hole wall of the through-hole in a force-fitting manner and engages in the indentation.

3. The component according to claim 2, wherein the indentation is in the form of an impressed chamfer.

4. The component according to claim 2, wherein the retaining portion is accommodated entirely in the through-hole.

5. The component according to claim 2, wherein the retaining portion is accommodated entirely in the through-hole.

6. The component according to claim 2, wherein the retaining portion extends through the component and is at least flush with a top side, facing away from the functional portion, of the first component, or projects therebeyond.

7. The component according to claim 5, wherein
   the retaining portion extends through the component and is at least flush with a top side, facing away from the functional portion, of the component, or projects therebeyond.

8. The component according to claim 6, wherein
   an interlayer element has been introduced between the retaining portion and the component.

9. The component according to claim 7, wherein
an interlayer element has been introduced between the retaining portion and the component.

10. The component according to claim 8, wherein
the retaining portion is additionally connected in a materially bonded manner to the interlayer element and/or the component.

11. The component according to claim 9, wherein
the retaining portion is additionally connected in a materially bonded manner to the interlayer element and/or the component.

12. The component according to claim 2, wherein
the functional portion is in the form of a bolt shank, threaded bolt, nut, compressed tube or part of a clip connection.

13. The component according to claim 7, wherein
the functional portion is in the form of a bolt shank, threaded bolt, nut, compressed tube or part of a clip connection.

14. A component assembly of at least two components that are joined at at least one joint, comprising:
a first component having the pressed-in auxiliary joining element according to claim 2; and
a second component, wherein
the auxiliary joining element is connected in a materially bonded manner to the second component or to a second auxiliary joining element provided in the second component.

15. The component assembly according to claim 14, wherein the first and/or second component is/are made of a lightweight material, and the auxiliary joining elements are made of steel.

16. The component assembly according to claim 14, wherein the component assembly is part of a vehicle body.

17. A method for producing a component having an auxiliary joining element, the method comprising the acts of:
creating a through-hole at at least one joint in the component;
introducing an indentation such that the through-hole is expanded in at least one peripheral region; and
pressing the auxiliary joining element into the through-hole such that a retaining portion of the auxiliary joining element is fixed to a hole wall of the through-hole in a force fitting manner and engages in the indentation, wherein
the auxiliary joining element has a functional portion.

18. The method according to claim 17, wherein
a second indentation is formed such that the through-hole is likewise expanded at the other peripheral region, and
the retaining portion forms an undercut at both indentations after the pressing in.

19. A method for producing a component assembly of at least two components that are joined at at least one joint, the method comprising the acts of:
forming a first component by way of a method according to claim 17;
positioning and orienting a second component relative to the first component; and
forming a materially bonded connection at the at least one joint by welding, soldering or adhesive bonding, wherein
the auxiliary joining element is connected in a materially bonded manner to a base material of the second component or to a second auxiliary joining element, which is provided at the joint in the second component.

* * * * *